United States Patent [19] [11] Patent Number: 4,470,493
Renaud [45] Date of Patent: Sep. 11, 1984

[54] CLUTCH RELEASE BEARING
[75] Inventor: Pierre Renaud, Le Plessis-Trevise, France
[73] Assignee: Valeo, Paris, France
[21] Appl. No.: 340,706
[22] Filed: Jan. 19, 1982
[30] Foreign Application Priority Data
 Feb. 2, 1981 [FR] France ................ 81 01932
[51] Int. Cl.³ .................................. F16D 23/14
[52] U.S. Cl. ...................... 192/98; 192/110 B
[58] Field of Search ............... 192/98, 110 B; 384/189 A, 184 A

[56] References Cited
U.S. PATENT DOCUMENTS
3,904,008  9/1975  Sonnerat ................ 192/98
3,921,776 11/1975  Sonnerat ................ 192/98
3,948,371  4/1976  Lonne ................... 192/98

FOREIGN PATENT DOCUMENTS
1451445  9/1966  France .
2024926  9/1970  France .
2109947  5/1972  France .
2210246  7/1974  France .
 474112 10/1937  United Kingdom .

Primary Examiner—Rodney H. Bonck
Assistant Examiner—James J. Merek
Attorney, Agent, or Firm—Charles E. Brown

[57] ABSTRACT

The invention relates to a clutch release bearing assembly using an operating element which, in order to be acted upon by a control member such as a disengaging fork, is carried by a support member mounted for axial movement. A tubular actuator forms an extension-piece, which, under the effect of the operating element is adapted to act on the disengagement mechanism of the clutch, and a bearing element is located between the operating element and the actuator. This bearing element comprises two coaxial rings mounted so as to be rotatable relative to each other. According to the invention the actuator is mounted to slide axially on a support guide, and swivel means are provided between this actuator and the support guide. This compensates for any defect in parallelism between the operating element support means and the support guide and prevents the actuator becoming jammed on the guide.

14 Claims, 2 Drawing Figures

CLUTCH RELEASE BEARING

BACKGROUND OF THE INVENTION

This invention relates generally to clutch release bearings, especially for motor vehicles, and more particularly to the assembly incorporating a clutch release bearing in a motor vehicle.

As is already known, an assembly of this kind generally uses an operating element acted upon by a control member, which in practice is a disengaging fork, and an actuator which, under the action of the operating element, is adapted to act on the disengaging mechanism of a clutch.

More particularly, but not exclusively, the invention relates to an assembly of this kind which further comprises a bearing element which is located between the operating element and the actuator, and which has two coaxial rings rotatably mounted relative to each other, and which is generally formed by a ball bearing.

In an assembly of this kind, the actuator is a separate part from the bearing element, in practice usually a tubular component which, forming an extension-piece, has the advantage of permitting both radial and axial offsetting of the zone of action of this bearing elment, thus enabling the latter to be constructed economically as a roller bearing of small diameter and simple construction, without any inherent complications.

For some applications at least, it is desirable that the tubular actuator thus forming the extension-piece should be mounted so as to slide axially on a support guide.

At the same time, in these applications, in order to be acted upon by the control member, the operating element is in turn carried by a support member mounted so as to be axially movable and necessarily distinct from the support guide.

Any defect of parallelism between this support member and the support guide may lead to malfunctions such as, for example, a condition in which the actuator becomes jammed on the support guide.

This invention relates generally to an arrangement for overcoming this disadvantage.

SUMMARY

More precisely, the invention provides a clutch release bearing assembly, notably for a motor vehicle, of the kind comprising an operating element which, in order to be acted upon by a control member such as a disengaging fork, is carried by a support member mounted for axial movement, and an actuator forming an extension-piece, which, under the action of the operating element, is adapted to act on the disengaging mechanism of a clutch, whereby the actuator is mounted to slide axially over a support guide, and swivel means are provided between the actuator and the support guide.

As a result, in the event of any defect in parallelism between the support guide for the actuator and the suppot member for the operating element, the actuator is able to tilt slightly relative to its support guide without becoming jammed thereon.

DESCRIPTION OF THE PREFERRED EMBODIMENT

Figure 1:
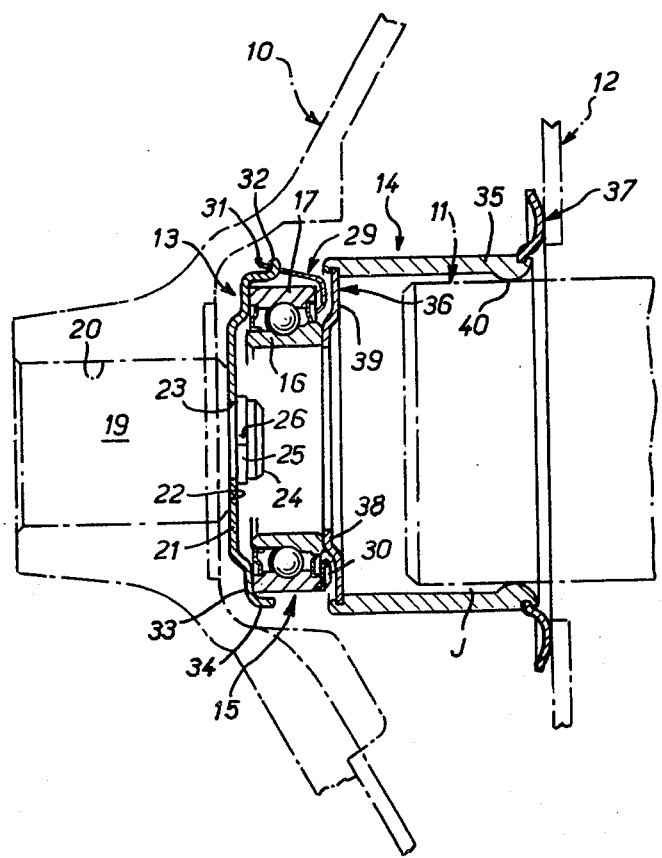
FIG. 1 is a schematic axial sectional view showing a release bearing assembly according to the invention.

This drawing partially shows, in broken lines, the cover 10 of a clutch, the hub 11 thereof, and, at 12, a disengagement mechanism which constitutes the control means for the clutch.

The disengagement mechanism 12 may simply consist, in a manner known per se, of the radial ends of the fingers of a diaphragm spring.

The release bearing assembly provided according to the invention for acting on this disengagement mechanism 12 makes overall use of an operating element 13, which is acted upon by a control member, in practice a disengaging fork (not shown), an actuator 14, forming an extension-piece, which is tubular in the embodiment shown, and which, under the effect of the operating element 13, is adapted to act on the disengaging mechanism 12, and a bearing element 15, which, being located between the operating element 13 and the actuator 14, comprises two coaxial rings 16, 17, one on the inside and one on the outside, which are rotatably mounted relative to each other.

In the embodiment shown, the operating element 13 is in the form of a support plate which, being suitably shaped as described hereinafter, extends overall at right angles to the axis of the assembly.

In any case, in order to be acted upon by the associated control member, the operating element 13 is carried by a support member 19, and this is mounted in an axially movable manner, slidingly engaging in a bore 20 in the casing 10 in order to be guided thereby.

In practice, this support member 19 is a simple spindle end to which the associated control member is coupled, upstream of the casing 10.

Since in practice, as shown, the release bearing assembly is subject to residual load ensuring that the assembly is permanently axially biased towards the disengagement mechanism 12, the support plate forming the operating element 13 abuts axially, with its central zone 21, against a transverse shoulder 22 of its support member 19, whilst engaging, by means of an axial opening 23, on an axial extension 24 thereof.

A flexible split ring 25 engaging in a groove 26 in this axial extension 24 of the support member 19 ensures, if necessary, that the operating element 13 is held in place axially relative to the support member 19.

In the embodiment shown, the bearing element 15 consists of ball bearings, which in this case are standard ball bearings.

The edge of its outer ring 17 faces towards the operating element 13 and is axially in contact therewith and, similarly, the edge of its inner ring 16 faces towards the actuator 14 and is thereby axially in contact with this actuator.

Moreover, in the embodiment shown, the bearing element 15 is coupled axially to the operating element 13 and is thus carried by the latter.

In the embodiment shown, the bearing element 15 is coupled axially to the operating element 13 via a cowling 29, and the latter comprises, on the one hand, a front wall 30 which undulates in a circular pattern like the undulating washers sold commercially under the name "ONDUFLEX", by which it abuts on the edge of the outer ring 17 of the bearing element 15 opposite the operating element 13, and a plurality of lugs 31 which are distributed in a circular arrangement, and by which it engages with hooks 32 provided for this purpose on the operating element 13, on the outer periphery of the support plate which forms this element 13.

The support plate forming the operating element 13 comprises, around its central area 21, for axial support of the bearing element 15, a peripheral area 33 which, owing to the fact that the ball bearings constituting the bearing element are standard bearings, is axially offset relative to the central area 23, towards the actuator 14, this central area 23 thus being axially spaced from the inner ring 16 of the ball bearings, and being peripherally defined by an edging 34 on which the hooks 32 are formed axially at intervals.

In practice, the bearing element 15 is transversely movable in every direction relative to the operating element 13, or, in other words, in contact with the peripheral zone 33 of the support plate forming this operating element 13, it has an omnidirectional capacity for movement which, in fact, is radially limited only by the edging 34 of the suport plate.

The release bearing assembly according to the invention thus constitutes a self-centering release bearing with maintained self-centering, whilst the axially effective flexible washer which forms the front wall 30 of the cowling 29 ensures that the bearing element 15 is held in place when this bearing element 15 is not subjected to any stress.

Obviously, the peripheral area 33 of the operating element 13 has a radial development sufficient to permit the desired self-centering.

According to the invention, since the actuator 14 is, for its part, mounted so as to slide axially over a support guide, formed in practice by the hub 11 of the clutch in question, swivel means are provided between it and the support guide.

In the embodiment shown, these swivel means are obtained by virtue of the fact that, for contact with its support guide, the actuator 14 comprises, projecting radially over its inner surface, an annular bead 40 having a rounded section in the axial direction.

In practice, as shown in the drawing, this annular bead 40 is located at the end of the actuator 14 which is furthest from the operating element 13, so as to benefit from the maximum lever arm.

As shown, the actuator 14 comprises an axial wall 35 on the inner surface of which the annular bead 40 is formed integral therewith, and, at opposite ends of this wall, radial flanges 36, 37 are provided the first for cooperating with the bearing element 15, and the second for acting on the disengagement mechanism 12.

The radial flange 36, which is radially directed towards the axis of the assembly, has two concentric zones axially offset relative to each other, one zone 38, which is the radially inner zone or central zone, for cooperating with the bearing element 15, and the other zone 39, the radially outer zone or peripheral zone, for connection with the axial wall 35.

This arrangement makes it possible to provide, in the axial direction, at right angles to the peripheral zone 39, the space needed for the front wall 30 of the cowling 29.

However, as will be noted, the central zone 21 of the operating element 13 and that 38 of the flange 36 of the actuator 14 are axially offset in the same direction, and this advantageously reduces the axial dimensions of the whole assembly.

Similarly, the radial flange 37 which is radially directed away from the axis of the assembly has a convex profile in the transverse direction, in order to act on the disengagement mechanism 12.

These radial flanges 36 and 37 may be integral with the axial wall 35 with which they are associated, being continuous therewith.

However, as shown in the drawing, as these radial flanges have different mechanical working conditions from the axial wall 35, they are preferably separate components from this axial wall 35 and are suitably mounted thereon.

This is true of the radial flange 37 which shouldhave a sufficient degree of hardness, and it is also true of the coating flange 36, which should also have a certain hardness.

In the embodiment shown, the radial flanges 36, 37 are simply mounted by being set on the axial wall 35, at the ends of this wall, these ends suitably being radially bent round for this purpose.

In any case, the the actuator 14 only comes into contact with the hub 11 forming its support guide by its bead 40: it can be deduced from this that there is an annular clearance J between the hub 11 and the axial wall 35 of the actuator 14.

The risk of seizing up is thereby reduced.

Moreover, in the case of an assembly with residual load and hence constant support, as explained hereinbefore, the actuator 14 is, in practice, kept separate from the bearing element 15, and simply abuts axially thereon.

In other words, there is no special axial connection between this actuator 14 and the bearing element 15.

In the event of any defect in parallelism between the hub 11 and the support member 19, the actuator 14 follows this bearing element 15, by reason of the contact between it and the bearing element 15, which inevitably implies some degree of friction, and therefore tilts slightly, if necessary, relative to the axis of the hub 11 which acts as its support guide.

However, due to the swivel means according to the invention, this tilting, which by every hypothesis remains within the limits of the clearance J specified above, advantageously does not give rise to any risk of the actuator 14 becoming jammed on its support guide.

In practice, by their flexibility, the fingers of the diaphragm constituting the disengagement mechanism 12 then absorb the effects of any such defect in parallelism.

Figure 2:
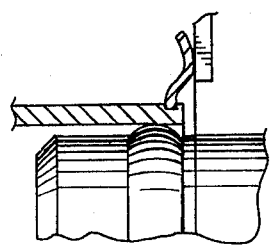
FIG. 2 is a fragmentary axial sectional view showing a slight modification of the invention.

According to an alternative embodiment shown in FIG. 2 and in accordance with an arrangement which is the reverse of that described hereinafter, the swivel means according to the invention are formed by the fact that, for contact with the actuator 14, the hub 11 acting as a support guide for the latter has projecting radially over its outer surface an annular bead 40 having a rounded section in the axial direction.

Moreover, this invention is not restricted to the embodiment described and shown, but covers all alternative embodiments within the scope of the claims appended hereto.

In particular, the axial wall of the actuator is not necessarily strictly tubular, for example, it may instead be generally tubular and fragmented in the circular direction into two or more columns.

Furthermore, the ball bearings constituting the bearing element need not necessarily be standard bearings.

On the contrary, they may be special bearings, the inner and outer rings of which have different axial lengths and/or are axially offset relative to each other, in a manner known per se.

In this case, the support plate forming the operating element and/or the flange of the actuator on which the bearing element abuts may be planar, without any zones axially offset relative to each other.

Furthermore, this invention is not limited to the case where the bearing element used is a ball bearing; this bearing element may instead consist of a graphite ring.

I claim:

1. A clutch release bearing assembly of the kind comprising an operating element adapted to be acted upon by a control member such as a disengaging fork, which operating element is carried by a support member mounted for axial movement, and an actuator comprising an extension piece which under the effect of the operating element is adapted to act on the disengagement mechanism of a clutch, wherein said actuator is mounted for axial sliding movement over support guide means, and swivel means are provided between said actuator and said support guide means, said actuator comprising a generally tubular member and swivel means comprising an annular bead having a rounded section in the axial direction projecting radially from the inner surface thereof, said annular bead being located at the end of the actuator which is furthest from the operating element.

2. A clutch release bearing assembly as claimed in claim 1, wherein a bearing element is disposed axially between the operating element and the actuator, said actuator is separate from said bearing element and abuts axially thereon.

3. A clutch release bearing assembly of the kind comprising an operating element adapted to be acted upon by a control member such as a disengaging fork, which operating element is carried by a support member mounted for axial movement, and an actuator comprising an extensionpiece which under the effect of the operating element is adapted to act on the disengagement mechanism of a clutch, wherein said actuator is mounted for axial sliding movement over support guide means, and swivel means are provided between said actuator and said support guide means, and swivel means comprising an annular bead having a rounded section in the axial direction projecting radially from the outer surface of the support guide for contact with said actuator.

4. A clutch release bearing assembly of the kind comprising an operating element adapted to be acted upon by a control member such as a disengaging fork, which operating element is carried by a support member mounted for axial movement, and an actuator comprising an extension piece which under the effect of the operating element is adapted to act on the disengagement mechanism of a clutch, wherein said actuator is mounted for axial sliding movement over support guide means and swivel means are provided between said actuator and said support guide means, said actuator comprising an axial wall and, at each end thereof, a radial flange, one of said radial flanges being adapted to cooperate with a bearing element disposed axially between said operating element and said actuator, and the other of said radial flanges being adapted to cooperate with the disengagement mechanism, and at least one of said radial flanges forming a part which is separate from the associated axial wall and suitably mounted thereon.

5. A clutch release bearing assembly as claimed in claim 4, wherein for supporting said bearing element, said operating element comprises a peripheral zone which is axially offset relative to a central zone, and said one radial flange comprises, for cooperation therewith, a central zone which is axially offset relative to a peripheral zone, and central zone of said operating element and central zone of said radial flange being axially offset in the same direction.

6. A clutch release bearing assembly comprising an operating element adapted to be controlled by a control member, a support member mounted for axial movement, said operating element carried by said support member for movement therewith, an actuator defining an axial extension responsive to axial movement of said operating element and adapted to be disposed axially between said operating element and a clutch disengagement member for operating the latter, a support guide axially slidably mounting said actuator, swivel means provided on a selected one of said actuator and said support guide for swivel contact with the nonselected one of said actuator and said support guide to compensate for lack of parallelism between said support member and said support guide.

7. A clutch release bearing assembly as claimed in claim 6, wherein said swivel means is provided on said actuator for swivel contact with said support guide.

8. A clutch release bearing assembly as claimed in claim 7, wherein said actuator comprises a generally tubular member and said swivel means comprises an annular bead having a rounded axial section, said annular bead projecting radially inwardly from the inner surface of said tubular member.

9. A clutch release bearing assembly as claimed in claim 8, wherein said annular bead is located at an end of said actuator remote from said operating element.

10. A clutch release bearing assembly as claimed in claim 6, wherein said swivel means is provided on said support guide for swivel contact with said actuator.

11. A clutch release bearing assembly as claimed in claim 10, wherein said swivel means comprises an annular bead having a rounded axial section projecting outwardly from the outer surface of said support guide.

12. A clutch release bearing assembly as claimed in claim 6, wherein a bearing element is interposed axially between said operating element and said actuator, said actuator being separate from said bearing element and abutting axially thereagainst.

13. A clutch release bearing assembly as claimed in claim 6, wherein said actuator comprises an axial wall, a radial flange being provided at each end of said axial wall, one of said radial flanges being adapted to cooperate with a bearing element interposed axially between said operating element and said actuator, and the other of said radial flanges being adapted to cooperate with the disengagement member, at least one of said radial flanges being separate from said axial wall and suitably secured thereto.

14. A clutch release bearing assembly as claimed in claim 13, wherein said operating element comprises a peripheral zone for supporting said bearing element and a central zone cooperative with said support member, said peripheral zone being radially offset relative to said central zone, said one radial flange comprising a central zone cooperating with said bearing element and a peripheral zone axially offset relative to said last mentioned central zone and connected to said axial wall, said peripheral zones of said actuator and said operating element being axially offset in the same direction relative to their respective central zones.

* * * * *